US011316644B2

(12) United States Patent
Sun et al.

(10) Patent No.: US 11,316,644 B2
(45) Date of Patent: Apr. 26, 2022

(54) DATA TRANSMISSION METHOD, AND NEW AS SUBLAYER ENTITY

(71) Applicants: China Mobile Communication Co., Ltd. Research Institute, Beijing (CN); China Mobile Communications Group Co., Ltd., Beijing (CN)

(72) Inventors: Junshuai Sun, Beijing (CN); Yingying Wang, Beijing (CN); Xueyan Huang, Beijing (CN); Xingyu Han, Beijing (CN)

(73) Assignees: CHINA MOBILE COMMUNICATION CO., LTD. RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 68 days.

(21) Appl. No.: 16/610,303

(22) PCT Filed: Mar. 8, 2018

(86) PCT No.: PCT/CN2018/078449
§ 371 (c)(1),
(2) Date: Nov. 1, 2019

(87) PCT Pub. No.: WO2018/201793
PCT Pub. Date: Nov. 8, 2018

(65) Prior Publication Data
US 2020/0084003 A1 Mar. 12, 2020

(30) Foreign Application Priority Data
May 5, 2017 (CN) .......................... 201710313934.4

(51) Int. Cl.
*H04L 5/00* (2006.01)
*H04W 76/15* (2018.01)
(Continued)

(52) U.S. Cl.
CPC ............ *H04L 5/0053* (2013.01); *H04L 5/001* (2013.01); *H04W 28/0268* (2013.01);
(Continued)

(58) Field of Classification Search
None
See application file for complete search history.

(56) References Cited

U.S. PATENT DOCUMENTS

2007/0268903 A1  11/2007  Nakagawa
2018/0139651 A1*  5/2018  Kim ........................ H04L 29/12
(Continued)

FOREIGN PATENT DOCUMENTS

CN          101132613 A    2/2008
CN          102291763 A    12/2011
(Continued)

OTHER PUBLICATIONS

LG Electronics, "Configurability for QoS flow ID attachment", Feb. 12, 2017, 3GPP Draft, R2-1701962, pp. 1-2.*
(Continued)

*Primary Examiner* — Adnan Baig
(74) *Attorney, Agent, or Firm* — Syncoda LLC; Feng Ma

(57) ABSTRACT

A data transmission method, and new AS sublayer entity. The data transmission method is applicable in a new AS sublayer entity, and comprises: receiving a quality of service flow (QoS flow) having a first flow ID; mapping the QoS flow to one or more data radio bearers (DRB) to obtain a protocol data unit (PDU) packet, wherein the PDU packet carries a second flow ID corresponding to the QoS flow, and the first flow ID and the second flow ID have a one-to-one
(Continued)

correspondence relationship with respect to combinations of the data radio bearer (DRB) IDs; and transmitting the PDU packet.

20 Claims, 14 Drawing Sheets

(51) Int. Cl.
    *H04W 76/27*     (2018.01)
    *H04W 28/02*     (2009.01)
    *H04W 28/06*     (2009.01)

(52) U.S. Cl.
    CPC ......... *H04W 28/065* (2013.01); *H04W 76/15* (2018.02); *H04W 76/27* (2018.02)

(56) References Cited

U.S. PATENT DOCUMENTS

2019/0313278 A1* 10/2019 Liu .................. H04W 80/08
2020/0100133 A1* 3/2020 Tang ................. H04W 72/085

FOREIGN PATENT DOCUMENTS

| | | |
|---|---|---|
| CN | 102868546 A | 1/2013 |
| EP | 2884794 A1 | 6/2015 |
| EP | 2884794 A4 | 8/2015 |
| EP | 2884794 B1 | 4/2017 |

OTHER PUBLICATIONS

LG Electronics, "Configurability for QoS flow ID attachment", Feb. 2017, 3GPP TSG-RAN, R2-1701962, pp. 1-2.*
International Search Report for International Application No. PCT/CN2018/078449, dated May 29, 2018, 2 pages.
Written Opinion for International Application No. PCT/CN2018/078449, dated May 29, 2018, 4 pages.
ZTE et al., "Discussion on intra-cell QoS flow remapping," 3GPP TSG RAN WG2#97bis, R2-1702827, 3GPP, Mar. 24, 2017.
LG Electronics Inc., "QoS layer PDU format," 3GPP TSG RAN WG2#97bis, R2-1703704, 3GPP, Mar. 25, 2017.
ZTE, "TS 23.502 P-CR to handover from EPS to NGS," 3GPP TSG SA WG2#120, S2-172154, 3GPP, Mar. 21, 2017.
MediaTek Inc., "On some open issues related to reflective QoS," 3GPP TSG RAN WG2#97bis, R2-1703530, 3GPP, Mar. 25, 2017.
LG Electronics Inc., "Configurability for QoS flow ID attachment," 3GPP TSG-RAN2 Meeting #97, R2-1701962, Feb. 12, 2017.
Ericsson, "QoS framework for NR," 3GPP TSG-RAN WG2 Meeting #96, R2-168657, Nov. 13, 2016.
LG Electronics Inc., "TP on SDAP PDU format," 3GPP TSG-RAN WG2 #98, R2-1704473, May 4, 2017.
Supplementary European Search Report dated Nov. 13, 2020 in corresponding European Patent Application No. 18794591.0.

* cited by examiner

DATA TRANSMISSION METHOD, AND NEW AS SUBLAYER ENTITY

CROSS-REFERENCE TO RELATED APPLICATIONS

The present application is a U.S. National Phase of PCT international Application No. PCT/CN2018/078449 with an International Filing Date of Mar. 8, 2018, which claims under 35 U.S.C. § 119(a) the benefit of Chinese Patent Application No. 201710313934.4, filed on May 5, 2017, the entire contents of which are incorporated by reference wherein.

TECHNICAL FIELD

The disclosure relates to the field of communication technology, and particularly to a data transmission method and a new Access stratum sublayer entity.

BACKGROUND

At present, a new protocol layer (a new access stratum (AS) sublayer shown in FIG. 1) is introduced into advancement of a 5th-Generation (5G) protocol stack scheme of the 3rd Generation Partnership Project (3GPP). In present disclosure, the new AS sublayer in the 5G protocol stack scheme is called a Service Data Adaptation Protocol (SDAP) layer and can have the following two basic functions.

Quality of Service (QoS) flows are mapped to a Data Radio Bearer (DRB).

QoS flow IDs are carried in an uplink/downlink packet.

It is to be noted that the new access stratum sublayer and the SDAP layer may also be described with other names.

Since values are usually allocated to QoS flow IDs in units of users uniformly and a value range is usually relatively wide, overhead for transmitting QoS flow IDs is relatively high.

SUMMARY

A data transmission method and a new access stratum sublayer entity are provided in the disclosure, to reduce overhead for transmitting QoS flow IDs.

In order to achieve the above objective, a data transmission method is provided according to an aspect of the disclosure, which includes the following operations.

QoS flows with first flow IDs are received.

The QoS flows are mapped to at least one DRB to obtain a Protocol Data Unit (PDU) packet. The PDU packet carries second flow IDs corresponding to the QoS flows, and the first flow IDs have one-to-one correspondences with combinations of the second flow IDs and DRB IDs.

The PDU packet is transmitted.

A data transmission method is provided according to another aspect of the disclosure, which may include the following operations.

A PDU packet carrying QoS flows mapped to a DRB is received.

The QoS flows are acquired.

A first flow ID of each of the QoS flows is obtained according to a second flow ID and a data radio bearer ID which are carried in the protocol data unit packet and corresponds to the QoS flow. The first flow IDs have one-to-one correspondences with combinations of the second flow IDs and the DRB IDs.

A new access stratum sublayer entity is further provided according to another aspect of the disclosure, which includes a quality of service flow receiving module, a protocol data unit packet acquiring module and a protocol data unit packet transmitting module.

The quality of service flow receiving module is configured to receive QoS flows with first flow IDs.

The protocol data unit packet acquiring module is configured to map the QoS flows to at least one DRB to obtain a PDU packet The PDU packet carries second flow IDs corresponding to the QoS flows, and the first flow IDs have one-to-one correspondences with combinations of the second flow IDs and a data radio bearer IDs.

The protocol data unit packet transmitting module is configured to transmit the protocol data unit packet.

Another new access stratum sublayer entity is further provided according to another aspect of the disclosure, which may include a PDU packet receiving module, a QoS flow acquiring module and a first flow ID acquiring module.

The protocol data unit packet receiving module is configured to receive a PDU packet carrying QoS flows mapped to a DRB.

The QoS flow acquiring module may be configured to acquire the QoS flows.

The first flow ID acquiring module may be configured to obtain a first flow ID of each of the QoS flows according to a second flow ID and a DRB ID which are carried in the PDU packet and corresponds to the QoS flow.

The first flow IDs have one-to-one correspondences with combinations of the second flow IDs and the DRB IDs.

Another new AS sublayer entity is further provided according to another aspect of the disclosure, which may include a processor and a memory.

The processor is configured to read a program in the memory to execute the following processes.

QoS flows with first flow IDs are received.

The QoS flows are mapped to at least one DRB to obtain a PDU packet. The PDU packet carries second flow IDs corresponding to the QoS flows, and the first flow IDs have one-to-one correspondences with combinations of the second flow IDs and DRB IDs.

The PDU packet is transmitted.

Another new AS sublayer entity is further provided according to another aspect of the disclosure, which may include a processor and a memory.

The processor is configured to read a program in the memory to execute the following processes.

A PDU packet carrying QoS flows mapped to a DRB is received.

The QoS flows are acquired.

A first flow ID of each of the QoS flows is obtained according to a second flow ID and a DRB ID which are carried in the PDU packet and correspond to the QoS flow. The first flow IDs have one-to-one correspondences with combinations of the second flow IDs and the DRB IDs.

A computer-readable storage medium is further provided according to another aspect of the disclosure, in which a computer program may be stored. The computer program, when being executed by a processor, implements the steps of a data transmission method corresponding to a new AS sublayer entity provided in the disclosure.

BRIEF DESCRIPTION OF DRAWINGS

FIG. 2-1 is a schematic diagram of a position of an SDAP flow ID in a PDU packet according to some embodiments of the disclosure.

FIG. 2-2 is a schematic diagram of a QoS flow ID and a DRB ID used for interaction between an SDAP and an upper layer thereof according to some embodiments of the disclosure.

FIG. 3-1 is a schematic diagram of a QoS flow ID and a DRB ID used for interaction between an SDAP and a lower layer thereof according to some other embodiments of the disclosure.

DETAILED DESCRIPTION

For making the technical problem to be solved, technical solutions and advantages of the disclosure clearer, detailed descriptions will be made below in combination with the drawings and specific embodiments.

Figure 2:
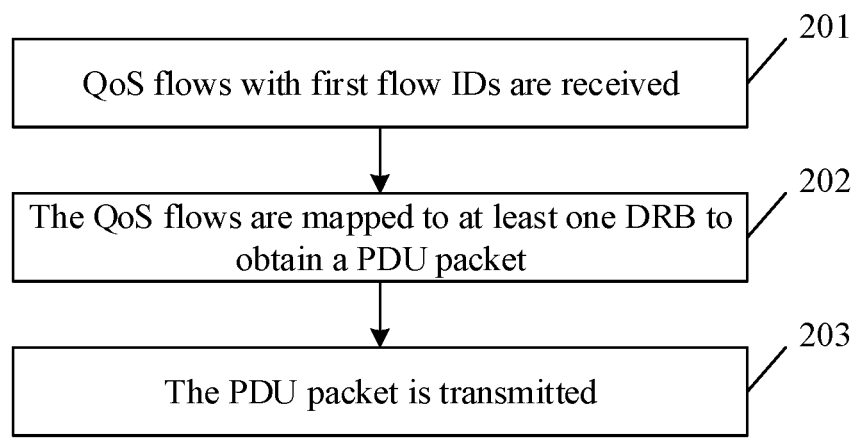
FIG. 2 is a flowchart of a data transmission method according to some embodiments of the disclosure.
Figures 1, 2:
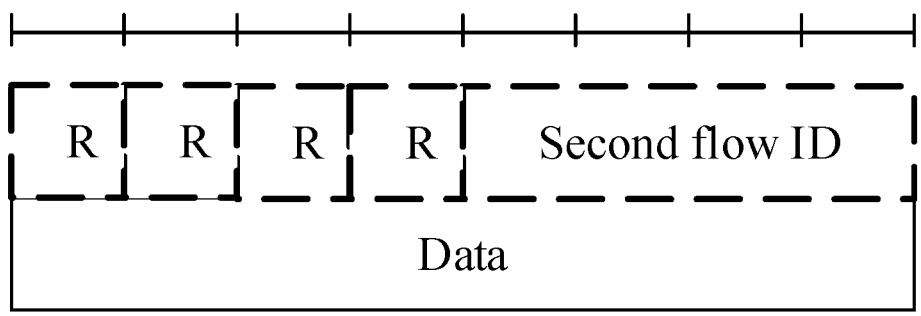
Figure 2:
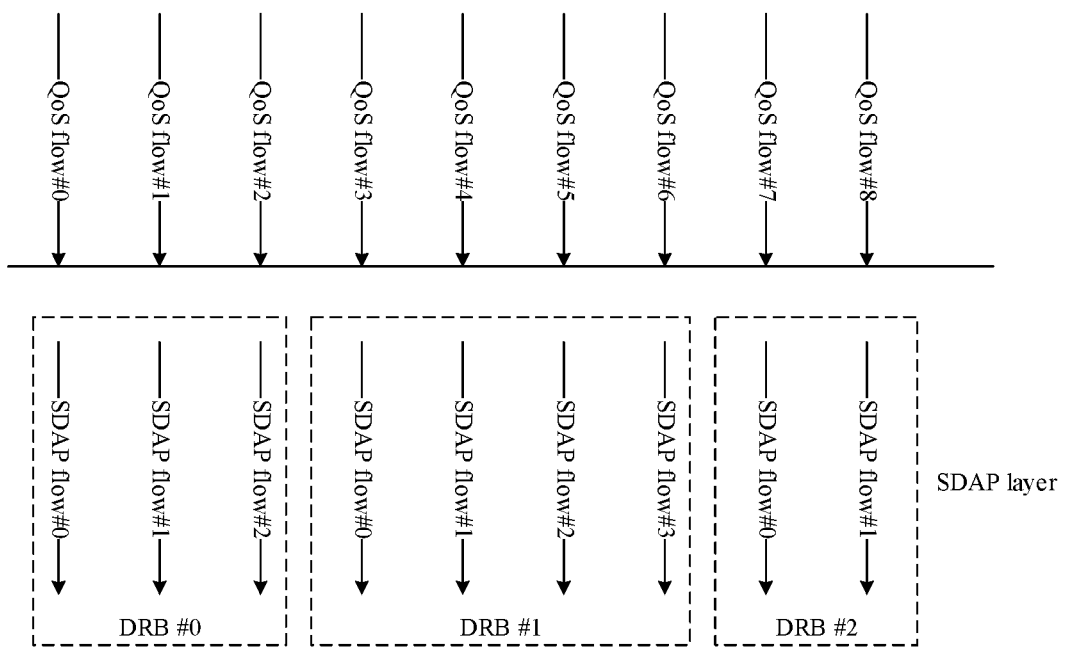

Referring to FIG. 2, FIG. 2 illustrates a data transmission method according to some embodiments of the disclosure. The data transmission method includes following steps 201 to 203.

In 201, QoS flows with first flow IDs are received.

The embodiments of the disclosure are applied to a new AS sublayer. In the current present 5G protocol stack scheme, the new AS sublayer may be, but be not limited to, an SDAP layer. For better understanding and describing the technical solutions of the disclosure, the embodiments of the disclosure are described with taking the new AS sublayer as an example of the SDAP layer.

In the current 5G protocol stack scheme, functions of the SDAP layer are defined as follows.

QoS flows are mapped to a DRB.

QoS flow IDs are carried in an uplink/downlink packet.

In the step, the SDAP layer may receive the QoS flows with the first flow IDs (i.e., QoS flow IDs) from a core network. That is, the Qos flows can be received with a sending function of the SDAP layer, and the QoS flows carry the QoS flow IDs. A value is generally allocated to the first flow ID in units of users uniformly.

In 202, the QoS flows are mapped to at least one DRB to obtain a PDU packet. The PDU packet carries a second flow IDs corresponding to the QoS flows, and the first flow IDs have one-to-one correspondences with combinations of the second flow IDs and a DRB IDs.

It can be seen from the above that the SDAP layer is required to implement mapping between the QoS flows and the DRB and transmission of the QoS flow IDs. Therefore, in this step, the SDAP layer may map the QoS flows to the at least one DRB to obtain the PDU packet of the SDAP layer.

For convenient description, in the SDAP layer, the QoS flow mapped to the DRB is called an SDAP flow. The Qos flows have a one-to-one mapping relationship with the SDAP flows, that is, there is no one-to-many or many-to-one mapping relationship between the Qos flows and the SDAP flows, so that a long QoS flow may subsequently be identified with a short ID.

In addition, one or more SDAP flows may be mapped to one DRB, but one SDAP flow may not be mapped to multiple DRBs at the same time.

The PDU packet of the SDAP layer carries the second flow IDs corresponding to the first flow IDs, and the first flow IDs have the one-to-one correspondences with the combinations of the second flow IDs and the DRB IDs.

The introduced second flow ID may be understood as an SDAP flow ID which can be recognized by the SDAP layer. Whether the SDAP flow ID may be recognized by another layer may be defined through a protocol according to a requirement, which is not described in the embodiments of the disclosure.

In the embodiments of the disclosure, the Qos flow ID is defined based on the second flow ID combined with an existing DRB ID. Since the existing DRB ID is reused, the Qos flow ID occupying many bits may be transformed into the second flow ID occupying small bits and is then transmitted in data transmission, which reduces overhead for transmitting the QoS flow ID.

For better understanding the one-to-one correspondences between the first flow IDs and the combinations of the second flow IDs and the DRB IDs, illustrations will be made below in combination with Table 1.

TABLE 1

| First flow ID | Second flow ID | DRB ID |
| --- | --- | --- |
| 0 | 0 | 0 |
| 1 | 1 | 0 |
| 2 | 2 | 0 |
| 3 | 3 | 0 |
| 4 | 4 | 0 |
| 5 | 5 | 0 |
| 6 | 6 | 0 |
| 7 | 7 | 0 |
| 8 | 0 | 1 |
| 9 | 1 | 1 |
| ... | ... | ... |
| 30 | 6 | 3 |
| 31 | 7 | 3 |

Referring to Table 1, it is assumed that the first flow IDs are coded as 0 to 31 and thus occupies five bits if being represented as a binary number. If each DRB may bear eight QoS flows, the second flow ID with three bits (i.e., code from 0 to 7) may be introduced, and combinations of four DRB IDs and second flow IDs may have one-to-one correspondences with all first flow IDs. For example, a second flow ID coded as 0 and a DRB ID coded as 1 may correspond to a first flow ID coded as 0, a second flow ID coded as 1 and a DRB ID coded as 2 may correspond to a first flow ID coded as 9, and the like.

It can be seen that, with introduction of the second flow IDs, the first flow IDs which originally occupy five bits requires only three bits. Since the bit number of the second flow IDs transmitted in the PDU packet is reduced, a system overhead may be reduced.

In 203, the PDU packet is transmitted.

In this step, the SDAP layer may transmit the PDU packet obtained in step 202 to a next layer.

In the embodiments of the disclosure, different QoS flows carried in the same DRB correspond to different second flow IDs.

In the embodiments of the disclosure, the bit number (n) of a second flow ID field is required to meet the following two criteria.

In a first criteria, the second flow ID field can identify all QoS flows (SDAP flows) that may be born in the DRB. Therefore, $2^n$ should be greater than or equal to a maximum number of the QoS flows that may be born in the DRB.

In a second criteria, from the angle of reducing overhead for transmission the second flow ID, n should be a minimum integer of integers taken in a case that $2^n$ is greater than or equal to the maximum number of the QoS flows that may be born in the DRB.

In an implementation of the disclosure, different QoS flows may be carried in the same DRB and different QoS flows correspond to different second flow IDs. As shown in Table 1, the DRB with the code 1 may carry the QoS flows with the codes from 0 to 7 and different QoS flows correspond to different second flow IDs.

SDAP flows carried in different DRBs may have the same second flow IDs. For example, all QoS flows with the QoS flow ID 0 correspond to the second flow ID 0 but correspond to different DRB IDs. Therefore, effective distinguishing may be implemented.

In addition, in the embodiments of the disclosure, the second flow IDs are set in units of DRBs, and each DRB may bear several SDAP flows. Second flow IDs are allocated to the SDAP flows carried in the same DRB uniformly. The second flow IDs in the same DRB are different from each other, to avoiding the second flow ID and the DRB ID from being the same code. The second flow IDs in different DRBs may be the same and are combined with DRB IDs for distinguishing.

As shown in Table 1, if a maximum number of QoS flows that may be born carried in one DRB is 8, a length of the second flow ID field should be 3 bit.

The forgoing is exemplary, and the length of the second flow ID field may be configured according to a practical transmission condition.

In an implementation of the disclosure, one QoS flow may be mapped to one DRB, that is, the DRB has a one-to-one mapping relationship with the QoS flow. In this case, the PDU packet of the SDAP layer may not carry the second flow ID. On the contrary, when multiple QoS flows are mapped to the same DRB at the same time, the PDU packet of the SDAP layer carries second flow IDs.

In the embodiments of the disclosure, the step that the QoS flows are mapped to the at least one DRB to obtain the PDU packet is implemented as follows. Each Qos flow is mapped to only one DRB according to the one-to-one correspondences.

Different second flow IDs are allocated to different QoS flows carried in the same DRB according to the one-to-one correspondences. A length of a second flow ID field used for recording the second flow IDs in the PDU packet is n-bit, and n is a minimum integer of integers taken in a case that $2^n$ is greater than or equal to a maximum number of QoS flows that may be carried in the DRB.

In the embodiments of the disclosure, the second flow ID field may be arranged at various positions. For example, the second flow ID field is arranged at a header or tail of the PDU packet.

After the position of the second flow ID field relative to the PDU packet is determined, the second flow ID field may also be located at a higher bit or a lower bit. The second flow ID field may also be combined with another field to form a whole byte of the PDU packet, and the second flow ID field is located in the middle of the byte.

That is, in an implementation of the disclosure, the second flow ID field may be arranged at the header of the PDU packet of the SDAP layer, or may also be arranged at the tail of the PDU packet of the SDAP layer. When the second flow ID field is arranged at the header of the PDU packet of the SDAP layer, the second flow ID field may be arranged at a higher bit of the header of the PDU packet of the SDAP layer, or may also be arranged at a lower bit of the header of the PDU packet of the SDAP layer. Similarly, such an arrangement manner is also adapted to the condition that the second flow ID field is arranged at the tail of the PDU packet of the SDAP layer.

Figure 1:
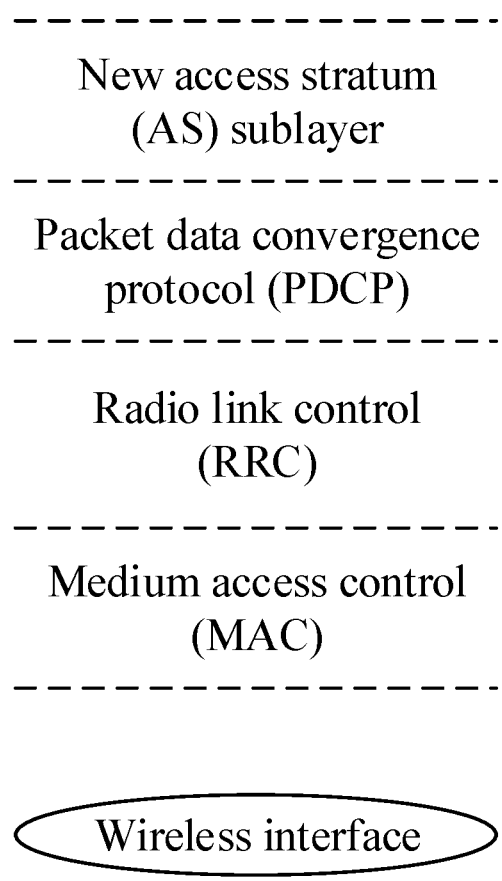
FIG. 1 is a schematic diagram of a new AS sublayer in a 5G protocol stack scheme according to a related art.

FIG. 2-1 illustrates the condition that the SDAP flow ID (i.e., the second flow ID) is arranged at the header of the PDU packet of the SDAP layer and located at the lower bit of the header.

In the embodiments of the disclosure, according to the length of the field, the second flow ID field may independently occupy one or more bytes of the header of the PDU packet, or, the second flow ID field may occupy one or more bytes of the header of the PDU packet together with another field, for convenient parsing.

That is, in an implementation of the disclosure, the header (or the tail) of the PDU packet of the SDAP layer may be independently occupied by the second flow ID field, or may also be occupied by the second flow ID field and the other field.

In addition, if the header (or tail) of the PDU packet of the SDAP layer includes only the second flow ID, a whole byte should be occupied by the second flow ID. If the second flow ID is not long enough to occupy the whole byte, FIG. 2-1 illustrates a whole byte occupied by the second flow ID together with a reserved field ("R" field). If the header (or tail) of the PDU packet of the SDAP layer further includes other field, the whole byte should be filled with both the second flow ID and the other field, and the remaining bits are filled with the "R" fields.

In the embodiments of the disclosure, not only a sender but also a receiver determines the first flow ID or the second flow ID according to the one-to-one correspondences between the first flow IDs and the combinations of the second flow IDs and the DRB IDs. Therefore, the embodiments of the disclosure further include the following operations.

A configuration table in which the one-to-one correspondences between the first flow IDs and the combinations of the second flow IDs and the DRB IDs are recorded is configured.

The configuration table may be configured in a process of creating or modifying a new AS sublayer entity, or may also be configured through Radio Resource Control (RRC) signaling.

When the configuration table is configured, the second flow ID corresponding to each first flow ID and a value of the second flow ID are configured, and also the DRB ID corresponding to each second flow ID is configured. Here, when different second flow IDs correspond to the same DRB ID, it is indicated that multiple SDAP flows are mapped to the same DRB.

For the configuration table, the configuration table may also be modified in a process of reconfiguring the new AS sublayer through the RRC. The modification includes but is not limited to, for example, the following operations of modifying or adding an SDAP flow, modifying the existing SDAP flow, or deleting the existing SDAF flow.

In the embodiments of the disclosure, the operation that the QoS flows are mapped to the at least one DRB to obtain the PDU packet includes the following operations.

A first flow ID of a QoS flow presently to be processed is acquired.

A second flow ID and a DRB ID corresponding to the first flow ID of the QoS flow presently to be processed are determined according to the one-to-one correspondences between the first flow IDs and the combinations of the second flow IDs and the DRB IDs.

The QoS flow presently to be processed is mapped to a DRB indicated by the DRB ID, and a second flow ID field corresponding to the QoS flow presently to be processed is assigned with the second flow ID field, to obtain the PDU packet.

In an implementation of the disclosure, the operation that the PDU packet is obtained may include the following process.

When the SDAP PDU packet is created or parsed, whether one SDAP flow or multiple SDAP flows are mapped to a DRB is determined according to an RRC signaling configuration. If one SDAP flow is mapped to the DRB, the PDU packet may include no second flow ID.

In practical, in the embodiments of the disclosure, the second flow ID field may also be a required field, and in this case, it is also required to obtain the second flow ID.

If the second flow ID is required to be transmitted, when the PDU packet is created, the second flow ID and the DRB ID corresponding to the first flow ID are looked up in the configuration table according to the first flow ID.

In the embodiments of the disclosure, in the step that the QoS flows are mapped to the at least one DRB to obtain the PDU packet, when the QoS flows have a many-to-one mapping relationship to the DRB, the PDU packet carries the second flow IDs.

It can be seen from the foregoing that, when the QoS flows have a many-to-one mapping relationship to the DRB, the PDU packet carries the second flow IDs, which is not described repeatedly herein for avoiding repetitions.

In the embodiments of the disclosure, through the mapping relationship between the first flow IDs and the second flow IDs, a flow ID occupying many bits may be transformed into a flow ID occupying small bits and is transmitted in data transmission. Since the bit number of the flow ID is reduced, the disclosure has the beneficial effect of reducing the system overhead.

Further descriptions will be made below in combination with FIG. 2-2.

As shown in FIG. 2-2, when the new AS sublayer receives nine QoS flows with QoS flow IDs 0 to 8, the new AS sublayer may determine according to the preconfigured one-to-one correspondences between the first flow IDs and the combinations of the second flow IDs and the DRB IDs that, in the nine QoS flows with Qos flow IDs 0 to 8, the three QoS flows with the QoS flow IDs 0 to 2 are mapped to a zeroth DRB, the four QoS flows with the QoS flow IDs 3 to 6 are mapped to a first DRB, and the two QoS flows with the QoS flow IDs 7 and 8 are mapped to a second DRB, and second flow IDs of the QoS flows mapped in the DRBs are 0, 1, 2, 0, 1, 2, 3, 0 and 1 respectively.

It can be found that, with the method of the embodiments of the disclosure, the second flow ID field carried in the PDU packet only requires two bits, which is fewer than four bits that are originally required, thereby reducing the system overhead.

Figure 3:
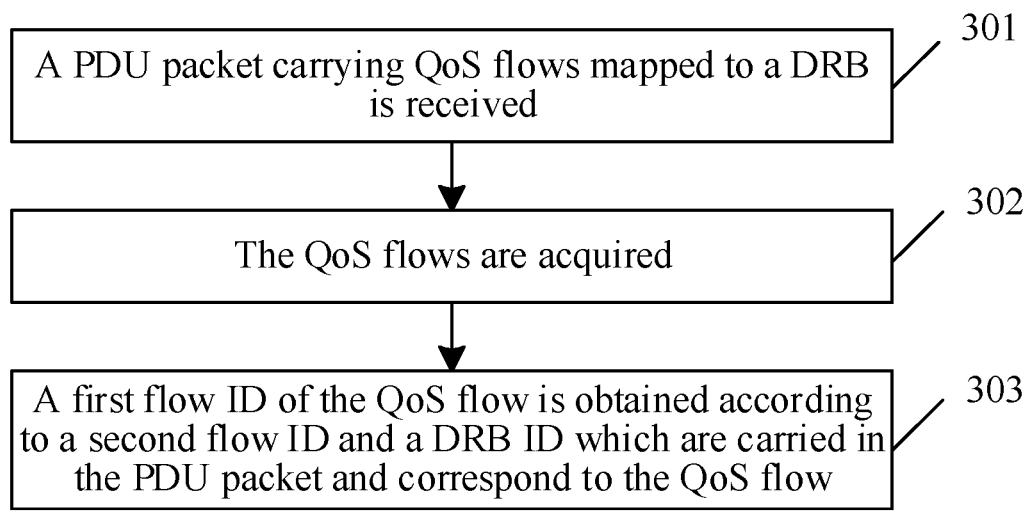
FIG. 3 is a flowchart of a data transmission method according to some other embodiments of the disclosure.
Figures 1, 3:
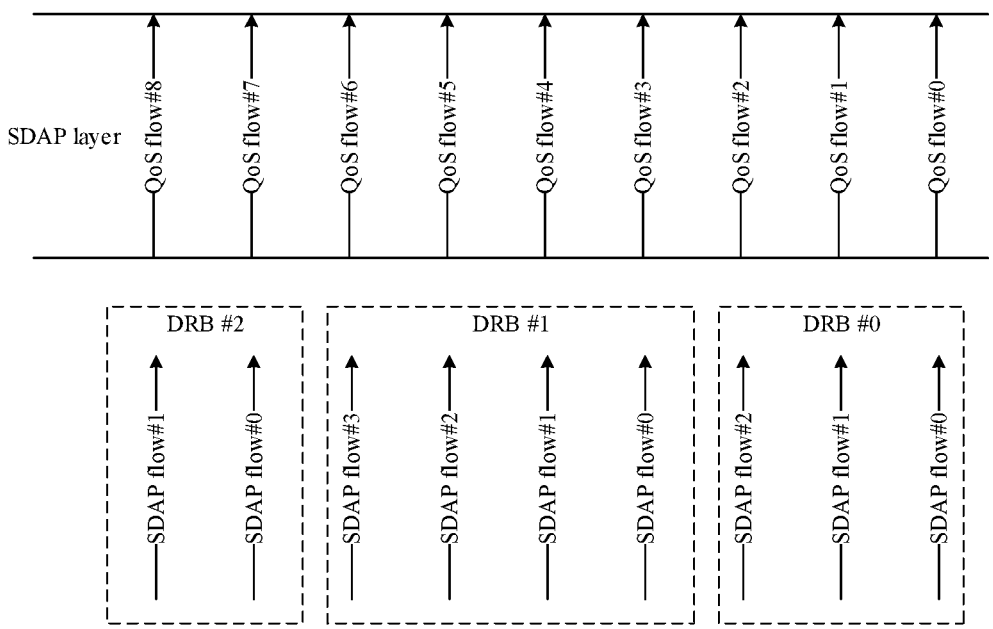

Referring to FIG. 3, FIG. 3 illustrates a data transmission method according to some other embodiments of the disclosure. The data transmission method includes the following steps 301 to 303.

In 301, a PDU packet carrying QoS flows mapped to a DRB is received.

In this step, an SDAP layer may receive the PDU packet carrying the QoS flows. The QoS flow is a flow mapped to the DRB, and the QoS flow carries a first flow ID (i.e., a QoS flow ID). That is, a QoS flow submitted to an upper layer by a receiving function portion of the SDAP layer also carries a QoS flow ID.

In 302, the QoS flows are acquired.

In this step, since the DRB is known to the SDAP layer, the SDAP layer may acquire the QoS flows from the PDU packet received in step 301 according to a mapping relationship between a DRB and QoS flows.

In 303, a first flow ID of the QoS flow is obtained according to a second flow ID and a DRB ID which are carried in the PDU packet and correspond to the QoS flow. The first flow IDs have one-to-one correspondences with combinations of the second flow IDs and the DRB IDs.

In this step, the SDAP layer may obtain the first flow ID of the QoS flow according to the second flow ID and DRB ID which are carried in the PDU packet and correspond to the QoS flow. It can be understood that the SDAP layer parses the second flow ID and the DRB ID to obtain the first flow ID.

Further descriptions will be made below in combination with FIG. 3-1.

As shown in FIG. 3-1, when a new AS sublayer receives three DRBs, in which, the first DRB corresponds to three SDAP flows coded as 0, 1 and 2 respectively, the second DRB corresponds to four SDAP flows coded as 0, 1, 2 and 3 respectively, and the third DRB corresponds to two SDAP flows coded as be 0 and 1 respectively, the new AS sublayer may determine according to the preconfigured one-to-one correspondences between the first flow IDs and the combinations of the second flow IDs and the DRB IDs, that QoS flow IDs of the nine QoS flows are 0, 1, 2, 3, 4, 5, 6, 7 and 8 respectively.

It can be found that, with the method of the embodiments of the disclosure, a second flow ID field carried in the PDU packet only requires two bits, which is fewer than four bits that are originally required, thereby reducing a system overhead.

For the remaining contents, reference may be made to the embodiments shown in FIG. 2 which is not described repeatedly for avoiding repetitions.

Optionally, the step that the QoS flows are acquired includes the following operations. The PDU packet is parsed to acquire the QoS flows, each of which is mapped to only one DRB.

The step that the first flow ID of the QoS flow is obtained according to the second flow ID and the DRB ID which are carried in the PDU packet and correspond to the QoS flow includes the following operations.

A second flow ID, recorded in a second flow ID field in the PDU packet, of each QoS flow and a DRB ID bearing the QoS flow are acquired.

A first flow ID corresponding to the acquired second flow ID and the acquired DRB ID is determined according to the one-to-one correspondences.

A length of the second flow ID field is n-bit, n is a minimum integer of integers taken in a case that 2^n is greater than or equal to the maximum number of the QoS flows that may be born in the DRB.

Optionally, the second flow ID field is arranged at a header or tail of the PDU packet; and/or the second flow ID field is located at a higher bit or a lower bit.

Optionally, the second flow ID field independently occupies one or more bytes of the header of the PDU packet; or the second flow ID field occupies one or more bytes of the header of the PDU packet together with another field.

Optionally, the method further includes the following operations.

A configuration table in which the one-to-one correspondences between the first flow IDs and the combinations of the second flow IDs and the DRB IDs are recorded is configured in a process of creating or modifying a new AS sublayer entity, or the configuration table is configured through RRC signaling.

Optionally, the method further includes the following operation.

The configuration table is modified in a process of reconfiguring the new AS sublayer by RRC.

Optionally, the method further includes the following operations.

After the QoS flows are acquired, whether the QoS flows have a many-to-one mapping relationship with the DRB is determined.

When the QoS flows have a many-to-one mapping relationship with the DRB, the step that the first flow ID of the QoS flow is obtained is triggered.

Figure 4:
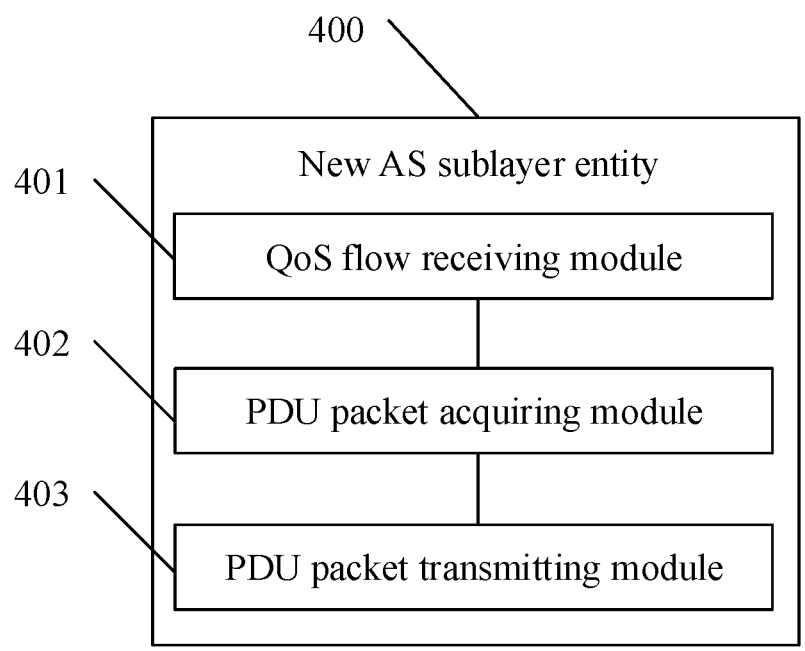
FIG. 4 is a schematic structural diagram of a new AS sublayer entity according to some embodiments of the disclosure.

Referring to FIG. 4, FIG. 4 illustrates a new AS sublayer entity according to some embodiments of the disclosure. The new AS sublayer entity 400 includes a QoS flow receiving module 401, a PDU packet acquiring module 402 and a PDU packet transmitting module 403.

The QoS flow receiving module 401 is configured to receive QoS flows with first flow IDs.

The PDU packet acquiring module 402 is configured to map the QoS flows to at least one DRB to obtain a PDU packet. The PDU packet carries second flow IDs corresponding to the QoS flows, and the first flow IDs have one-to-one correspondences with combinations of the second flow IDs and a DRB IDs.

The PDU packet transmitting module 403 is configured to transmit the PDU packet.

Optionally, the PDU packet acquiring module 402 is configured to: map each QoS flow to only one DRB according to the one-to-one correspondences; and allocate different second flow IDs to different QoS flows born in the same DRB according to the one-to-one correspondences. The length of a second flow ID field used to record the second flow IDs in the PDU packet is n-bit, and n is a minimum integer of integers taken in a case that 2^n is greater than or equal to the maximum number of the QoS flows that may be born in the DRB.

Optionally, the second flow ID field is arranged at a header or tail of the PDU packet; and/or the second flow ID field is located at a higher bit or a lower bit.

Optionally, the second flow ID field independently occupies one or more bytes of the header of the PDU packet; or the second flow ID field occupies one or more bytes of the header of the PDU packet together with another field.

Figure 5:
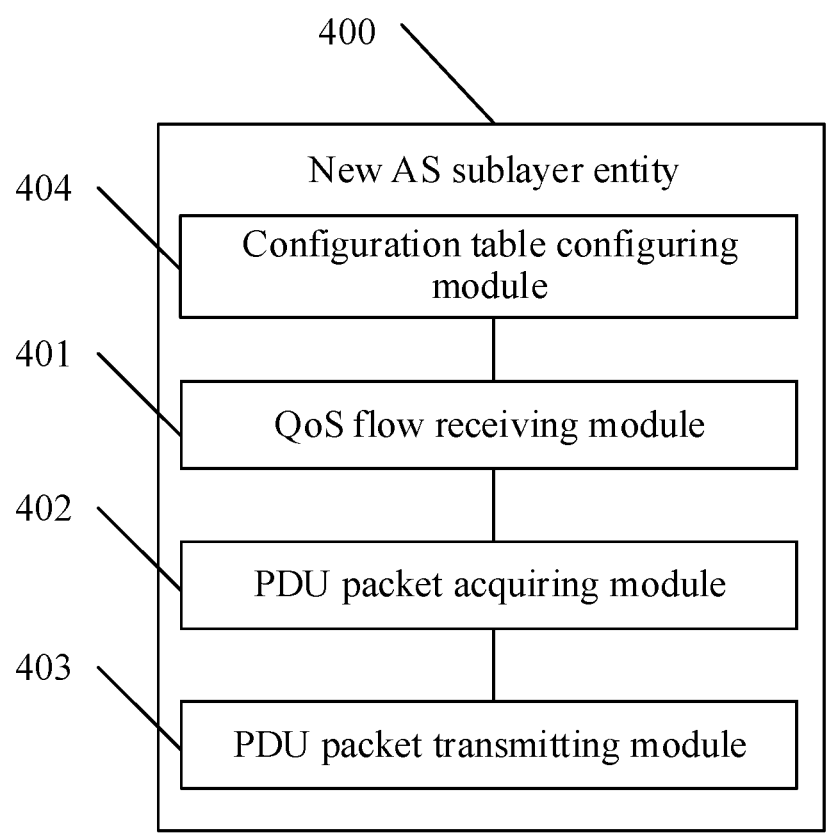
FIG. 5 is a schematic structural diagram of a new AS sublayer entity according to some other embodiments of the disclosure.

Optionally, as shown in FIG. 5, the new AS sublayer entity 400 further includes a configuration table configuring module 404, which is configured to: configure a configuration table in which the one-to-one correspondences between the first flow IDs and the combinations of the second flow IDs and the DRB IDs are recorded in a process of creating or modifying the new AS sublayer entity; or configure the configuration table through RRC signaling.

Figure 6:
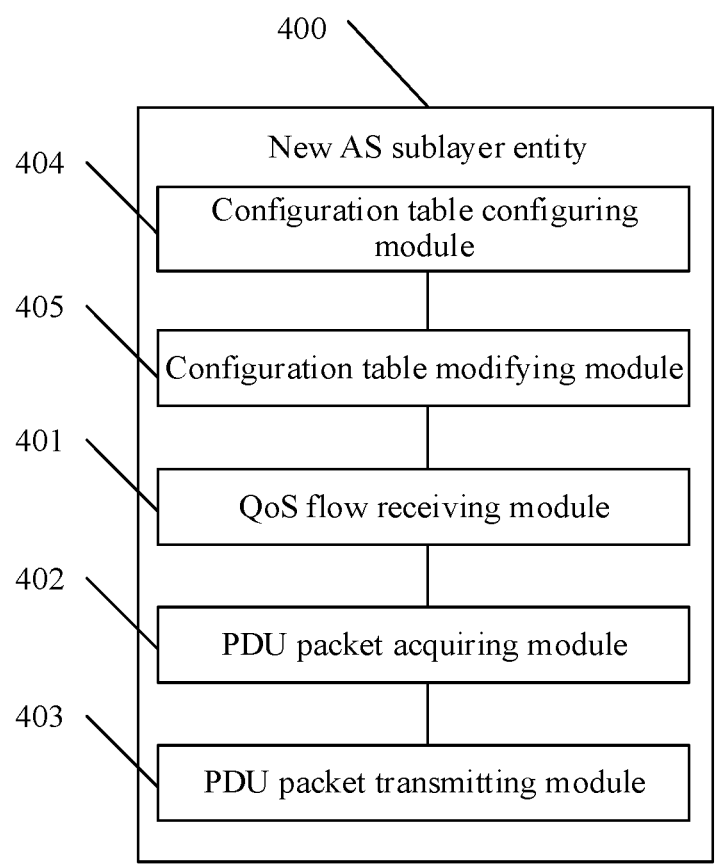
FIG. 6 is a schematic structural diagram of a new AS sublayer entity according to some other embodiments of the disclosure.

Optionally, as shown in FIG. 6, the new AS sublayer entity 400 further includes a configuration table modifying module 405, which is configured to modify the configuration table in a process of reconfiguring a new AS sublayer by RRC.

Optionally, the PDU packet acquiring module 402 is configured to: acquire the first flow ID of a QoS flow presently to be processed; determine a second flow ID and a DRB ID corresponding to the first flow ID of the QoS flow presently to be processed according to the one-to-one correspondences between the first flow IDs and the combinations of the second flow IDs and the DRB IDs; and map the QoS flow presently to be processed to a DRB indicated by the DRB ID and assign a second flow ID field corresponding to the QoS flow presently to be processed with the second flow ID field, to obtain the PDU packet.

Optionally, when the QoS flows have a many-to-one mapping relationship with the DRB, the PDU packet carries the second flow IDs.

Figure 7:
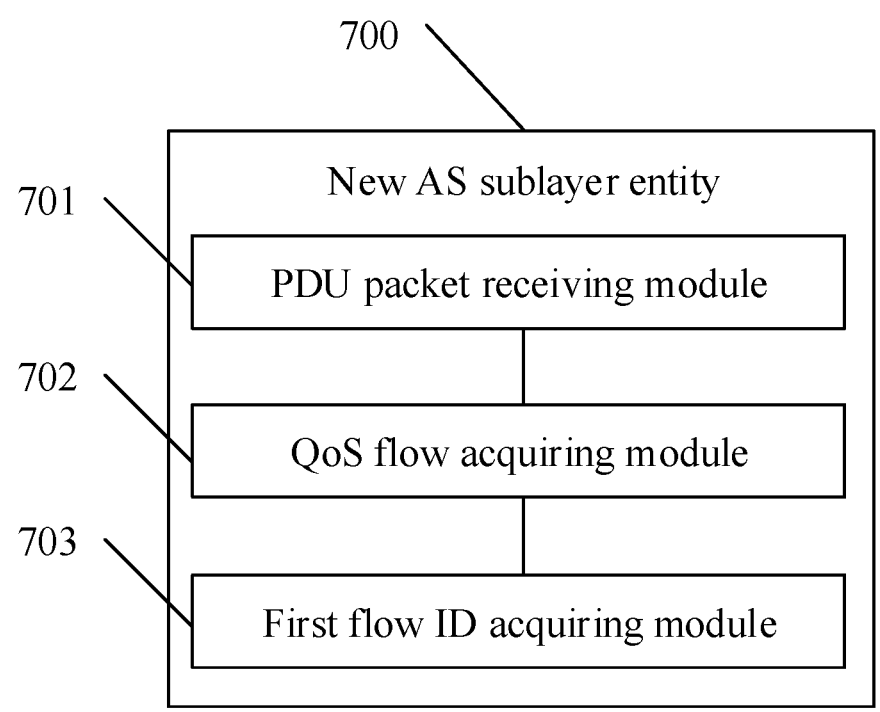
FIG. 7 is a schematic structural diagram of a new AS sublayer entity according to some other embodiments of the disclosure.

Referring to FIG. 7, FIG. 7 illustrates a new AS sublayer entity according to some other embodiments of the disclosure. The new AS sublayer entity 700 includes a PDU packet receiving module 701, a QoS flow acquiring module 702 and a first flow ID acquiring module 703.

The PDU packet receiving module 701 is configured to receive a protocol data unit (PDU) packet carrying QoS flows mapped to a data radio bearer (DRB).

The QoS flow acquiring module 702 is configured to acquire the QoS flows.

The first flow ID acquiring module 703 is configured to obtain a first flow ID of each of the QoS flows according to a second flow ID and a DRB ID which are carried in the PDU packet and correspond to the QoS flow.

The first flow IDs have one-to-one correspondences with combinations of the second flow IDs and the DRB IDs.

Optionally, the QoS flow acquiring module 702 is configured to parse the PDU packet to acquire all QoS flows, each of which is mapped to only one a DRB.

The first flow ID acquiring module 703 is configured to: acquire a second flow ID, recorded in a second flow ID field in the PDU packet, of each QoS flow and a DRB ID bearing the QoS flow; and determine a first flow ID corresponding to the acquired second flow ID and the acquired DRB ID according to the one-to-one correspondences.

A length of the second flow ID field is n-bit, and n is a minimum integer of integers taken in a case that 2^n is greater than or equal to a maximum number of QoS flows that may be born in the DRB.

Optionally, the second flow ID field is arranged at a header or tail of the PDU packet and/or the second flow ID field is located at a higher bit or a lower bit.

Optionally, the second flow ID field independently occupies one or more bytes of the header of the PDU packet; or the second flow ID field occupies one or more bytes of the header of the PDU packet together with another field.

Figure 8:
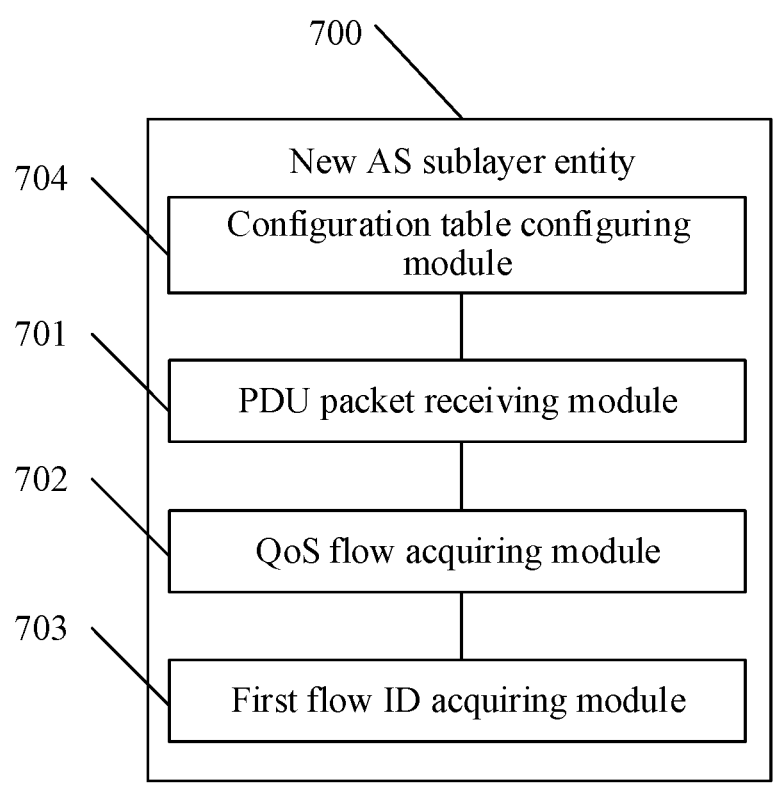
FIG. 8 is a schematic structural diagram of a new AS sublayer entity according to some other embodiments of the disclosure.

Optionally, as shown in FIG. 8, the new AS sublayer entity 700 further includes a configuration table configuring module 704, which is configured to: configure a configuration table in which the one-to-one correspondences between the first flow IDs and the combinations of the second flow IDs and the DRB IDs are recorded in a process of creating or modifying a new access stratum sublayer entity; or configure the configuration table through RRC signaling.

Figure 9:
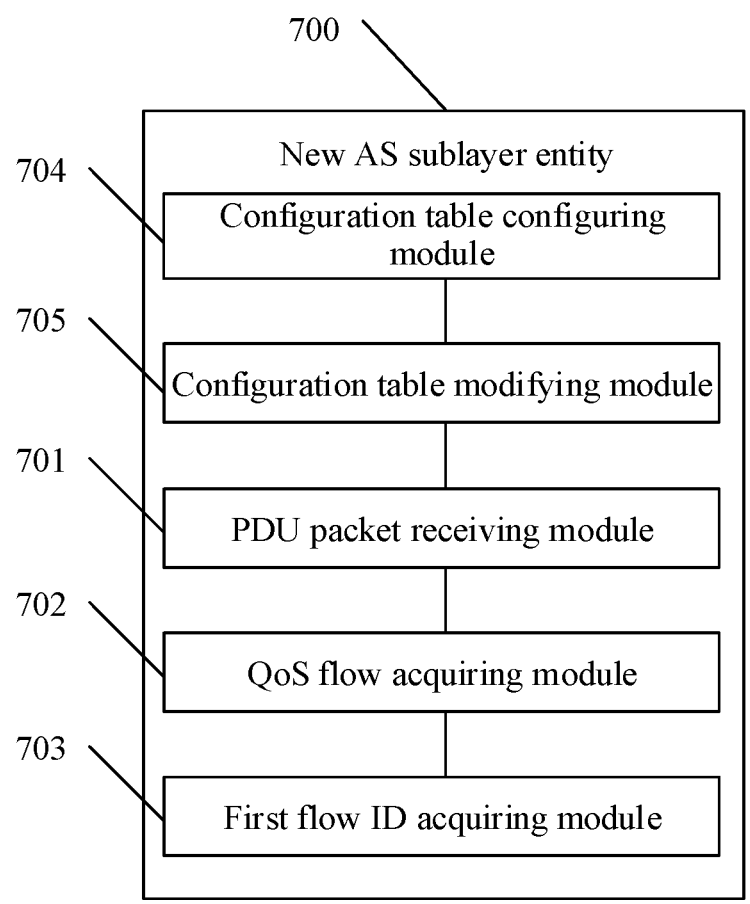
FIG. 9 is a schematic structural diagram of a new AS sublayer entity according to some other embodiments of the disclosure.

Optionally, as shown in FIG. 9, the new AS sublayer entity 700 further includes a configuration table modifying module 705, configured to modify the configuration table in a process of reconfiguring the new access stratum sublayer by RRC.

Figure 10:
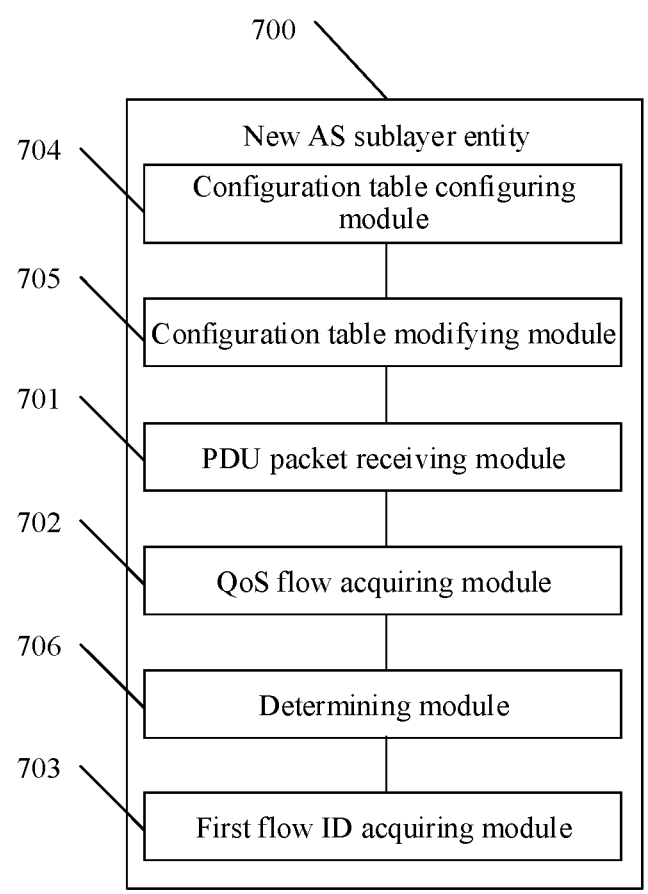
FIG. 10 is a schematic structural diagram of a new AS sublayer entity according to some other embodiments of the disclosure.

Optionally, as shown in FIG. 10, the new AS sublayer entity 700 further includes a determining module 706, which is configured to: after the QoS flows are acquired, determining whether the QoS flows have a many-to-one mapping relationship with the DRB; and when the QoS flows have a many-to-one mapping relationship with the DRB, triggering the first flow ID acquiring module.

Figure 11:
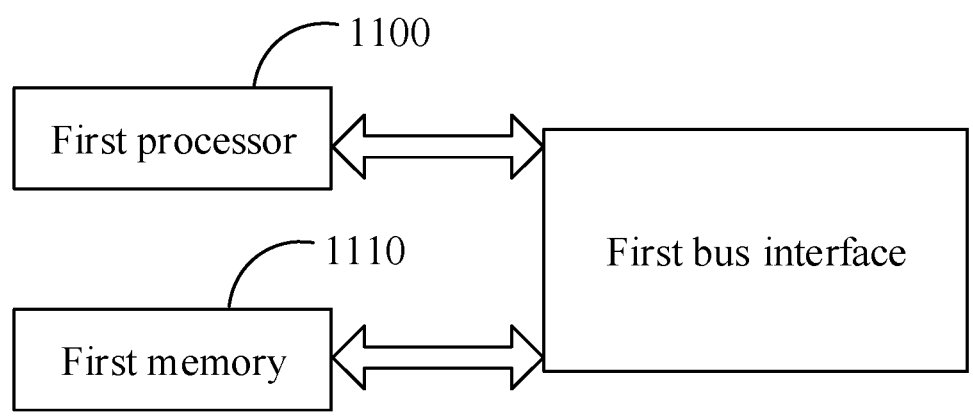
FIG. 11 is a schematic structural diagram of a new AS sublayer entity according to some other embodiments of the disclosure.

Referring to FIG. 11, FIG. 11 illustrates a new AS sublayer entity according to some embodiments of the disclosure. The new AS sublayer entity includes a first processor 1100 and a first memory 1110.

The first processor 1100 is configured to read a program in the memory 1110 to execute the following processes.

QoS flow with first flow IDs are received.

The QoS flows are mapped to at least one DRB to obtain a PDU packet. The PDU packet carries second flow IDs corresponding to the QoS flows, and the first flow IDs have one-to-one correspondences with combinations of the second flow IDs and DRB IDs.

The PDU packet is transmitted.

Figure 12:
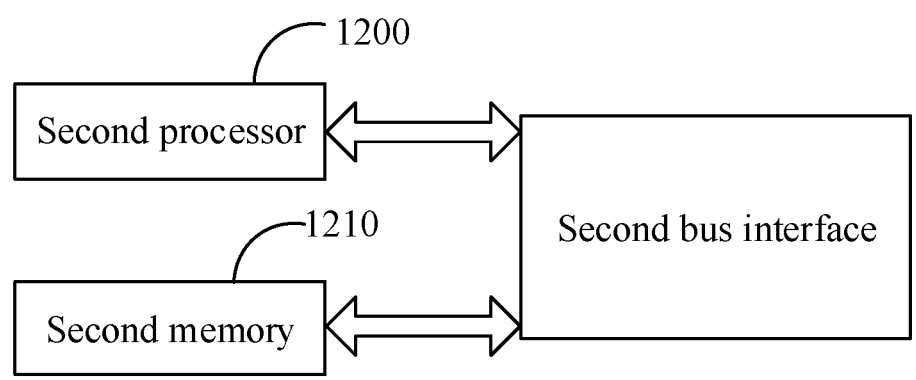
FIG. 12 is a schematic structural diagram of a new AS sublayer entity according to some other embodiments of the disclosure.

Referring to FIG. 12, FIG. 12 illustrates a new AS sublayer entity according to some other embodiments of the disclosure. The new AS sublayer entity includes a second processor 1200 and a second memory 1210.

The second processor 1200 is configured to read a program in the memory 1210 to execute the following processes.

A PDU packet carrying QoS flows mapped to a DRB is received.

QoS flows are acquired.

A first flow ID of each of the QoS flows is obtained according to a second flow ID and a DRB ID which are carried in the PDU packet and correspond to the QoS flow. The first flow IDs have one-to-one correspondences with combinations of the second flow IDs and the DRB IDs.

According to another aspect, a computer-readable storage medium is further provided according to some other embodiments of the disclosure, in which a computer program is stored. The computer program, when being executed by a processor, implements the steps of a data transmission method corresponding to a new AS sublayer entity provided in the disclosure.

The foregoing is the optional embodiments of the disclosure. It is to be pointed out that those of ordinary skill in the art may further make several improvements and embellishments without departing from the principle of the disclosure and these improvements and embellishments shall also fall within the scope of protection of the disclosure.

The invention claimed is:

1. A data transmission method, applied to a service data adaptation protocol (SDAP) layer and comprising:
   receiving quality of service (QoS) flows with first flow IDs;
   mapping the QoS flows to at least one data radio bearer (DRB) to obtain a protocol data unit (PDU) packet, wherein the PDU packet carries SDAP flow IDs corresponding to the QoS flows, and the first flow IDs have one-to-one correspondences with combinations of the SDAP flow IDs and DRB IDs; and
   transmitting the PDU packet.

2. The data transmission method of claim 1, wherein the operation of mapping the QoS flows to the at least one DRB to obtain the PDU packet comprises:
   mapping each of the QoS flows to only one DRB according to the one-to-one correspondences; and
   allocating different SDAP flow IDs to different QoS flows born in the same DRB according to the one-to-one correspondences, a length of a second flow ID field used to record the SDAP flow IDs in the PDU packet being n-bit, and n being a minimum integer of integers taken in a case that $2^n$ is greater than or equal to a maximum number of QoS flows that are able to be born in the DRB.

3. The data transmission method of claim 2, wherein
   the second flow ID field is arranged at a header or tail of the PDU packet; and/or
   the second flow ID field is located at a higher bit or a lower bit.

4. The data transmission method of claim 3, wherein
   the second flow ID field independently occupies one or more bytes of the header of the PDU packet; or
   the second flow ID field occupies one or more bytes of the header of the PDU packet together with another field.

5. The data transmission method of claim 1, further comprising:
   configuring a configuration table in which the one-to-one correspondences between the first flow IDs and the combinations of the SDAP flow IDs and the DRB IDs are recorded in a process of creating or modifying the SDAP layer; or
   configuring the configuration table through radio resource control (RRC) signaling.

6. The data transmission method of claim 5, further comprising:
   modifying the configuration table in a process of reconfiguring the SDAP layer by RRC.

7. The data transmission method of claim 1, wherein the mapping the QoS flows to the at least one DRB to obtain the PDU packet comprises:
   acquiring the first flow ID of the QoS flow presently to be processed;
   determining an SDAP flow ID and a DRB ID corresponding to the first flow ID of the QoS flow presently to be processed according to the one-to-one correspondences between the first flow IDs and the combinations of the SDAP flow IDs and the DRB IDs; and
   mapping the QoS flow presently to be processed to a DRB indicated by the DRB ID, and assigning a second flow ID field corresponding to the QoS flow presently to be processed with the SDAP flow ID, to obtain the PDU packet.

8. The data transmission method of claim 1, wherein the step of mapping the QoS flows to the at least one DRB to obtain the PDU packet comprises:
 carrying the SDAP flow IDs in the PDU packet when the QoS flows have a many-to-one mapping relationship with the DRB, and
 not carrying the SDAP flow ID in the PDU packet when the QoS flows do not have many-to-one mapping relationship with the DRB.

9. A data transmission method, applied to a service data adaptation protocol (SDAP) layer and comprising:
 receiving a protocol data unit (PDU) packet carrying quality of service (QoS) flows mapped to a data radio bearer (DRB);
 acquiring the QoS flows; and
 obtaining a first flow ID of each of the QoS flows according to an SDAP flow ID and a DRB ID which are carried in the PDU packet and correspond to the QoS flow, the first flow IDs have one-to-one correspondences with combinations of the SDAP flow IDs and the DRB IDs.

10. The data transmission method of claim 9, wherein the step of acquiring the QoS flows comprises:
 parsing the PDU packet to acquire all QoS flows, each of which is mapped to only one data radio bearer; and
 the step of obtaining a first flow ID of each of the QoS flows according to an SDAP flow ID and a DRB ID which are carried in the PDU packet and correspond to the QoS flow comprises:
 acquiring a SDAP flow ID, recorded in a second flow ID field in the PDU packet, of each QoS flow and a DRB ID of the DRB bearing the QoS flow, and
 determining a first flow ID corresponding to the acquired SDAP flow ID and the acquired DRB ID according to the one-to-one correspondences,
 wherein a length of the second flow ID field is n-bit, and n is a minimum integer of integers taken in a case that $2^n$ is greater than or equal to a maximum number of QoS flows that are able to be born in the DRB.

11. The data transmission method of claim 10, wherein the second flow ID field is arranged at a header or tail of the PDU packet; and/or
 the second flow ID field is located at a higher bit or a lower bit.

12. The data transmission method of claim 11, wherein the second flow ID field independently occupies one or more bytes of the header of the PDU packet; or
 the second flow ID field occupies one or more bytes of the header of the PDU packet together with another field.

13. The data transmission method of claim 9, further comprising:
 configuring a configuration table in which the one-to-one correspondences between the first flow IDs and the combinations of the SDAP flow IDs and the DRB IDs are recorded in a process of creating or modifying the SDAP layer; or
 configuring the configuration table through radio resource control (RRC) signaling.

14. The data transmission method of claim 13, further comprising:
 modifying the configuration table in a process of reconfiguring the SDAP layer by RRC.

15. The data transmission method of claim 9, further comprising:
 after the QoS flows are acquired, determining whether the QoS flows have a many-to-one mapping relationship with the DRB; and
 when the QoS flows have a many-to-one mapping relationship with the DRB, triggering the step of obtaining the first flow ID of each of the QoS flows.

16. A service data adaptation protocol (SDAP) layer, comprising:
 a processor; and
 a memory,
 wherein the processor is configured to read a program in the memory to execute operations of:
 receiving quality of service (QoS) flows with first flow IDs;
 mapping the QoS flows to at least one data radio bearer (DRB) to obtain a protocol data unit (PDU) packet, wherein the PDU packet carries SDAP flow IDs corresponding to the QoS flows, and the first flow IDs have one-to-one correspondences with combinations of the SDAP flow IDs and DRB IDs; and
 transmitting the PDU packet.

17. The SDAP layer of claim 16, wherein the processor is further configured to read the program in the memory to execute operations of:
 mapping each of the QoS flows to only one DRB according to the one-to-one correspondences; and
 allocating different SDAP flow IDs to different QoS flows born in the same DRB according to the one-to-one correspondences, a length of a second flow ID field used to record the SDAP flow IDs in the PDU packet being n-bit, and n being a minimum integer of integers taken in a case that $2^n$ is greater than or equal to a maximum number of QoS flows that are able to be born in the DRB.

18. The SDAP layer of claim 17, wherein
 the second flow ID field is arranged at a header or tail of the PDU packet; and/or
 the second flow ID field is located at a higher bit or a lower bit.

19. The SDAP layer of claim 18, wherein
 the second flow ID field independently occupies one or more bytes of the header of the PDU packet; or
 the second flow ID field occupies one or more bytes of the header of the PDU packet together with another field.

20. The SDAP layer of claim 16, wherein the processor is further configured to read the program in the memory to execute operations of:
 configuring a configuration table in which the one-to-one correspondences between the first flow IDs and the combinations of the SDAP flow IDs and the DRB IDs are recorded in a process of creating or modifying the SDAP layer; or
 configuring the configuration table through radio resource control (RRC) signaling.

* * * * *